United States Patent
Watt (10) Patent No.: US 7,134,003 B2
(45) Date of Patent: Nov. 7, 2006

(54) VARIABLE CYCLE INSTRUCTION EXECUTION IN VARIABLE OR MAXIMUM FIXED CYCLE MODE TO DISGUISE EXECUTION PATH

(75) Inventor: Simon Charles Watt, Cambridge (GB)

(73) Assignee: ARM Limited, Cambridge (GB)

( * ) Notice: Subject to any disclaimer, the term of this patent is extended or adjusted under 35 U.S.C. 154(b) by 197 days.

(21) Appl. No.: 10/512,093

(22) PCT Filed: Oct. 6, 2003

(86) PCT No.: PCT/GB03/04304

§ 371 (c)(1),
(2), (4) Date: Nov. 12, 2004

(87) PCT Pub. No.: WO2004/053685

PCT Pub. Date: Jun. 24, 2004

(65) Prior Publication Data

US 2005/0289331 A1   Dec. 29, 2005

(30) Foreign Application Priority Data

| Dec. 12, 2002 | (GB) | ................... 0229068.3 |
| Feb. 5, 2003 | (GB) | ................... 0302646.5 |
| Feb. 5, 2003 | (GB) | ................... 0302650.7 |
| Apr. 4, 2003 | (GB) | ................... 0307823.5 |

(51) Int. Cl.
*G06F 9/30* (2006.01)

(52) U.S. Cl. .................. 712/229; 712/208; 713/502
(58) Field of Classification Search .............. None
See application file for complete search history.

(56) References Cited

U.S. PATENT DOCUMENTS

| 4,566,062 A | 1/1986 | Ohnishi et al. ........... 712/216 |
| 5,802,360 A * | 9/1998 | Fernando ................. 712/229 |
| 5,961,633 A | 10/1999 | Jaggar .................... 712/241 |

FOREIGN PATENT DOCUMENTS

| JP | 59-5354 | 1/1984 |
| WO | WO 00/42499 | 7/2000 |
| WO | WO 01/69378 | 9/2001 |

* cited by examiner

*Primary Examiner*—Kenneth S. Kim
(74) *Attorney, Agent, or Firm*—Nixon & Vanderhye P.C.

(57) ABSTRACT

A data processing system 2 is provided which is responsive to program instructions that operate in a variable timing mode to require a variable number of processing cycles to complete. The system is also operable in a fixed timing mode, which may be programmable using a bit (or several bits) within a configuration controlling register, to operate in a fixed timing mode in which such instructions are forced to operate using a fixed number of processing cycles. Thus, suppression of instructions which fail their condition codes may be suppressed and early termination of program instructions similarly suppressed in a manner which helps resist an attack upon the security of the system by observing the number of processing cycles required to process certain data.

24 Claims, 11 Drawing Sheets

| Rn[i]t | Rn[i]t | $\overline{Rn[i]t}$ | Rn[i]t+1 | | Rd[i]t | | Rd[i]t+1 | $\overline{Rd[i]t+1}$ Rd[i]t | $\overline{Rd[i]t+1}$ $\overline{Rd[i]t}$ | Transitions Rn $\overline{Rn}$ Rd $\overline{Rd}$ |
|---|---|---|---|---|---|---|---|---|---|---|
| 0 | 0 | 1 | 0 | | 0 | | 1 | 1 | 0 | — — → ← |
| 0 | 0 | 1 | 0 | | 1 | | 0 | 0 | 1 | — — ← → |
| 0 | 0 | 0 | 1 | | 0 | | 0 | 1 | 1 | ← → — — |
| 0 | 0 | 0 | 1 | | 1 | | 1 | 0 | 0 | ← → — — |
| 1 | 1 | 0 | 0 | | 0 | | 1 | 1 | 0 | → ← — — |
| 1 | 1 | 0 | 0 | | 1 | | 0 | 0 | 1 | → ← — — |
| 1 | 1 | 1 | 1 | | 0 | | 0 | 1 | 1 | — — ← → |
| 1 | 1 | 1 | 1 | | 1 | | 1 | 0 | 0 | — — → ← |

$$Rd[i]t+1 = \left(\overline{Rn[i]t \text{ XOR } Rn[i]t+1}\right) \text{ XOR } Rd[i]t$$

VARIABLE CYCLE INSTRUCTION EXECUTION IN VARIABLE OR MAXIMUM FIXED CYCLE MODE TO DISGUISE EXECUTION PATH

This application is the U.S. national phase of international application PCT/GB2003/004304, filed 6 Oct. 2003, which designated the U.S. and claims priority to GB Application No. 0229068.2 filed 12 Dec. 2002, GB Application No. 0302650.7 filed 5 Feb. 2003, GB Application No. 0302646.5 filed 5 Feb. 2003 and GB Application No. 0307823.5 filed 4 Apr. 2003. The entire contents of these applications are incorporated herein by reference.

This invention relates to the field of data processing systems. More particularly, this invention relates to data processing systems in which at least some program instructions require a variable number of processing cycles to complete.

It is known to provide processor cores, such as those designed by ARM Limited of Cambridge, England, which have instructions requiring a variable number of processing cycles to complete. Some of these program instructions may be conditional instructions, which are encoded to only be executed if certain conditions are satisfied in relation to the execution of preceding instructions, e.g. a preceding instruction produced a zero result, an overflow, a carry or the like. In order to increase processor performance it is also known to provide processors with early termination techniques whereby a multicycle operation will be early terminated if the processor determines that the result will not be altered by subsequent processing cycles, e.g. a multicycle add operation in which all of the high order bits of both operands are zeros and so there is no need to calculate the high order bits in the later processor cycles once it has been determined that there is no carry into them. There are many other examples of program instructions which can take a variable number of processing cycles to complete.

It is becoming increasingly important to provide processors which can operate with a high degree of security, for example, such that the data which they are manipulating cannot be subject to unauthorised access. As an example, processor cores provided in smartcards for handling financial transactions often utilise highly secret cryptographic keys to verify passwords, data and the like. These cryptographic keys must be kept secret if the security and integrity of the system is to be maintained. One known technique for attacking the security of such systems is to try to identify information regarding the data being processed by counting the number of processing cycles taken to complete a given operation. If there is a correlation between the number of processing cycles taken and the data being processed, then it is possible for this to reveal information regarding the data being processed.

It is known to seek to resist cycle counting attacks on the security of a system by carefully writing the computer program code such that it will take a fixed number of cycles to complete irrespective of the flow through the computer program. In practice this is difficult to achieve since the knowledge and skill required by a programmer is of a high level and it is difficult to ensure/test that the desired aim of making the number of processing cycles equal in all circumstances has been achieved. Furthermore, many of the productivity enhancing tools commonly used by programmers, such as compilers, are not well suited to generating such secure code since they will normally produce code which varies the number of processing cycles consumed in a significant way depending upon the program path being followed.

Viewed from one aspect the present invention provides apparatus for processing data, said apparatus comprising:
a processor responsive to a plurality of different program instructions to perform respective processing operations each requiring a number of processing cycles to complete, said plurality of program instructions including at least one variable timing instruction requiring between a minimum number of cycles and a maximum number of cycles to complete, wherein
said processor is operable in a variable timing mode in which said at least one variable timing instruction is permitted to take a variable number of processing cycles to complete; and
said processor is operable in a fixed timing mode in which said at least one of variable timing instruction is forced to take said maximum number of cycles to complete.

The present invention recognises that the variable timing instructions provided within processors to speed processing operation and reduce power consumption can be a positive disadvantage in the context of a secure system in which it is desired to obscure any relationship between the number of processing cycles taken and the data being processed. At the same time, the strong advantages associated with variable timing instructions, such as increased speed and reduced power consumption are desirable when not processing secure data. The present technique recognises the above problem and also maintains the advantages associated with the existing systems in those circumstances where this is possible by providing a system operable in a variable timing mode and a fixed timing mode. In the variable timing mode, variable timing instructions are permitted to take their variable number of processing cycles to complete whereas in the fixed timing mode the variable timing instructions are constrained to always take a fixed number of cycles to complete. Thus, when processing secure data, the system may be placed in the fixed timing mode and the number of processing cycles taken to complete a processing operation more readily obscured whereas when not processing secure data the system may operate in the variable timing mode whereby the speed advantages and reduced power consumption advantages associated with the mechanisms for variable timing are exploited. The fixed timing mode makes it easier for a programmer to write program code which will take a fixed number of processing cycles to complete irrespective of the program flow path since the timing of each instruction will be independent of the data being processed. This also makes it easier to provide compilers able to generate fixed timing code.

As previously mentioned, the present technique is applicable to a wide range of program instructions that can take variable timings, but is particularly well suited to embodiments in which one or more conditional instructions is executed in a manner dependent upon whether the system is in the fixed timing mode in which the conditional instruction is forced to take a fixed number of processing cycles irrespective of any condition codes and a variable timing mode in which the execution of the instruction may be suppressed if the condition codes match certain parameters.

In the context of executing conditional instructions in the fixed timing mode that would have been suppressed in the variable timing mode, preferred embodiments of the invention are such that the conditional instruction is blocked from making any change having an effect upon subsequent data processing, e.g. the conditional instruction may be prevented from updating or changing any state within the processor which could influence subsequent processing.

A type of program instruction to which the present technique is well suited is a conditional branch instruction as without this technique such instructions can have a strong influence upon program timing depending upon whether or not the branch is suppressed. When operating in the fixed timing mode, a conditional branch instruction will be forced to perform a branch even when the condition codes are not met, but in this circumstance the branch will be to the next instruction in the program flow irrespective of the branch target specified in the conditional branch instruction such that the next instruction is executed in the same way as if the conditional branch instruction had been suppressed in its entirety.

In the case where the conditional instruction is a conditional data manipulating instruction, then preferred embodiments of the invention are such that when in the fixed timing mode the conditional data manipulating instruction is executed when the condition codes are failed and it would be normally suppressed such that the instruction is executed but is prevented from writing a result in any normal result destination of the conditional data manipulating instruction.

In order to resist a security attack based upon observing a variation in the power consumed by the processor dependent upon whether or not a result is being written from a conditional data manipulating instruction, preferred embodiments operate such that a result is written to one or more dummy destinations when the condition codes are failed instead of being written to the normal result destination. In this way, the power consumption can be kept substantially the sane irrespective of whether or not the condition codes are failed with the conditional data manipulating instruction always being executed and always resulting in a result being written even if this is only to a dummy destination.

Another type of instructions capable of variable timing execution are those capable of early termination in dependence upon one or more data values being processed. Preferred embodiments operate in the fixed timing mode to suppress any early termination even when the mechanisms in place within the system for providing such early termination variable timing mode indicate that it is possible. As an example, it may be detected that one of the operands in a multiply is a zero and accordingly the result will be a zero irrespective of the other operands and so the instruction is capable of being early terminated with a result of zero. However, in the fixed timing mode, the instruction will be forced to utilise its full number of processing cycles and then return the zero result.

As examples of the preferred types of instruction capable of early termination there are multicycle multiply instructions, multicycle divide instructions, multicycle add instructions and multicycle subtract instructions.

Whilst it is possible that the system may be placed into the fixed timing mode in dependence upon some hardware signal or the like, in preferred embodiments of the invention the processor may be configured to adopt either the variable timing mode or the fixed timing mode in dependence upon a programmable mode controlling parameter, e.g. one or several bits.

In this way, the system can be switched under software control between the variable timing mode when secure data is not being processed and high performance is required with low power consumption and a fixed timing mode when secure data is being processed and the requirement to obscure any dependence upon the data being processed of the number of processing cycles take takes precedence over speed or power consumption considerations.

A preferred way of setting the programmable mode controlling parameter is to store this within a system configuration register, such as a system controlling coprocessor.

Viewed from another aspect the present invention provides a method of processing data using a processor responsive to a plurality of different program instructions to perform respective processing operations each requiring a number of processing cycles to complete, said plurality of program instructions including at least one variable timing instruction requiring between a minimum number of cycles and a maximum number of cycles to complete, said method comprising the steps of:

operating said processor in a variable timing mode in which said at least one variable timing instruction is permitted to take a variable number of processing cycles to complete; and operating said processor in a fixed timing mode in which said at least one of variable timing instruction is forced to take said maximum number of cycles to complete.

Embodiments of the invention will now be described, by way of example only, with reference to the accompanying drawings in which.

Figure 1:
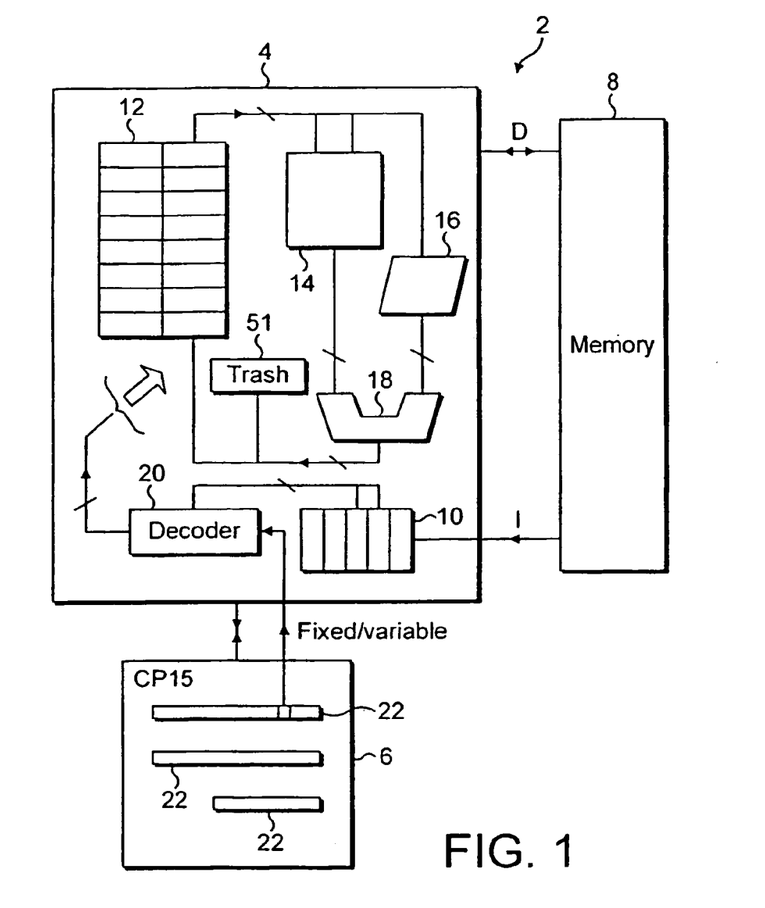
FIG. 1 schematically illustrates a data processing system operable in a fixed timing mode and a variable timing mode.

FIG. 1 illustrates a data processing system 2 including a processor core 4, a coprocessor 6 and a memory 8.

In operation, the processor core 4 fetches instructions and data from the memory 8. The instructions are fed to an instruction pipeline 10 where they occupy successive pipeline stages such as, for example, fetch, decode, execute, memory and write back on successive processing cycles. Pipelined processors are in themselves well known as a way of effectively executing a number of program instructions in a partially overlapping fashion in order to improve processor performance.

The data values read from the memory 8 by the processor core 4 are supplied to a register bank 12 from where they may be manipulated under program instruction control using one or more of a multiplier 14, a shifter 16 and an adder 18. Other data manipulating circuits may be provided, such as circuits performing logical operations, such as ANDs, Ors, count leading zeros etc.

FIG. 1 also illustrates an instruction decoder 20 within the processor core 4 which is responsive to a program instruction within the instruction pipeline 10 to generate execution control signals that are applied to the various processing elements, such as the register bank 12, the multiplier 14, the shifter 16 and the adder 18 in order to control the data processing operations performed. As an example, the control signals generated by the decoder 20 may cause the appropriate operands to be read from the register bank 12 and supplied and acted upon by the appropriate ones of the multiplier 14, the shifter 16 and the adder 18 so as to generate a result which is written back into the register bank 12.

The coprocessor 6 is a system configuration coprocessor containing a number of configuration registers 22 which may be written under program control to set up configuration controlling parameters. These configuration controlling parameters can specify many aspects of the configuration of the processing system 2, such as for example the endianess and the like. Included within one of these configuration controlling registers 22 is a bit which specifies whether or not the processor core should operate in a fixed timing mode or a variable timing mode. This bit is illustrated as being supplied as an input to the instruction decoder 20, but it will be appreciated that this bit may also be supplied to various other points within the processor core 4 as required to control their behaviour. In dependence upon this fixed/variable bit, the processor core 4 operates in either a fixed timing mode or a variable timing mode. When in the fixed timing mode at least one program instruction which has a variable timing (i.e. takes a variable number of processing cycles to complete) in the variable timing mode, is instead forced to have a fixed timing (e.g. take the maximum possible number of processing cycles to complete irrespective of whether or not it could have been suppressed in its entirety or completed in less than the maximum number of processing cycles. As the instruction decoder 20 is primarily responsible for decoding the program instructions and instructing the activity of the other elements of the processor core 4, the instruction decoder 20 can take the major role in controlling the processor core 4 to either operate in the fixed timing mode or the variable timing mode. Not all variable timing instruction need be provided with a fixed timing mode type of operation.

It will be appreciated that in the above description a single bit in the configuration controlling register 22 is shown as switching between fixed and variable timing modes. Alternatively, multiple bits within the configuration controlling register 22 may be provided to separately enable and disable the fixed or variable timing behaviour of different types of instruction, such as conditional instruction behaviour, uniform branch behaviour, disabling early terminate, etc.

Figure 2:
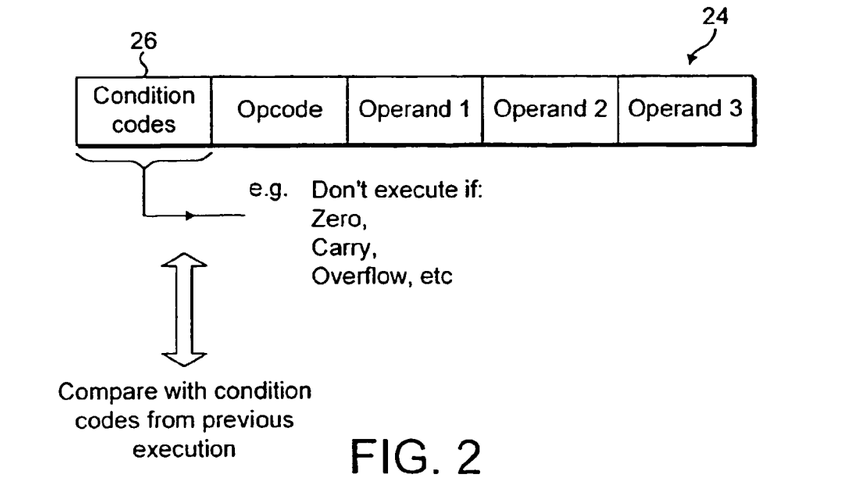
FIG. 2 schematically illustrates a conditional programming instruction.

FIG. 2 schematically illustrates a conditional instruction 24. This conditional instruction may be part of an instruction set which includes only some conditional instructions or part of an instruction set, such as the ARM instruction set, which is substantially fully conditional. The condition codes 26 encode a set of processor state conditions in which the associated instruction either will or will not be executed. As an example, the condition codes 26 can be arranged to specify that the instruction 24 will not execute if the condition codes currently set in the system indicate a zero result, a carry has occurred, an overflow has occurred or the like. This type of instruction can be utilised to provide efficient program coding. The fixed/variable bit at least partially suppresses the conditional behaviour in that the instruction will execute irrespective of its condition codes, but may not write its result in a way that has an effect upon the processor state.

Figure 3:
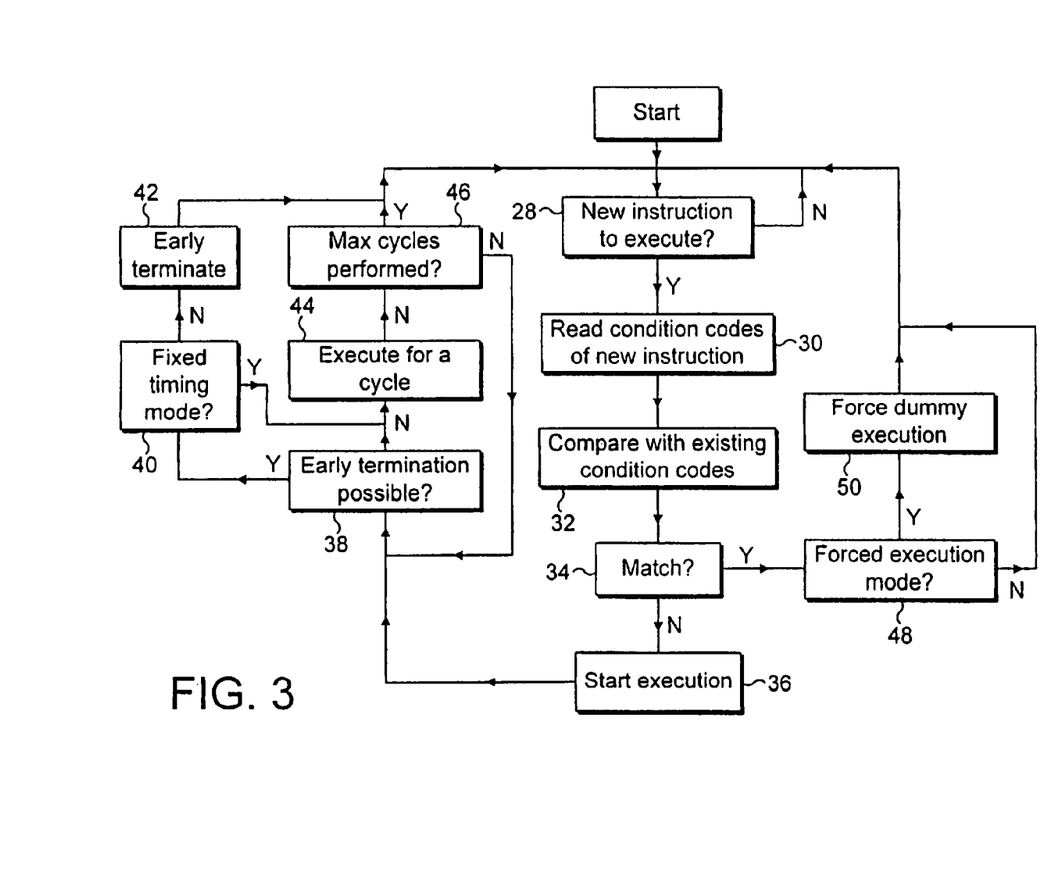
FIG. 3 is a flow diagram schematically illustrating part of the processing operations performed by an instruction decoder operating in accordance with the present techniques.

FIG. 3 is a flow diagram schematically illustrating part of the processing operations performed by the instruction decoder 20. It will be appreciated that FIG. 3 illustrates these processing operations as a logical sequence, whereas in practice these processing operations may be performed at least partially in parallel or in a different order.

At step 28, the instruction decoder 20 waits for a new instruction to execute. When a new instruction is received processing proceeds to step 30 at which the condition codes associated with the new instruction are read. At step 32 these condition codes are compared with the currently existing condition codes in the system. These condition codes currently existing in the system are the result of previous processing activity, either in the immediately preceding instruction or in the last instruction which would have updated those condition codes.

At step 34, a check is made for a match between the condition codes 26 of the current instruction being executed and the existing condition codes. If a match does not occur, then processing proceeds to step 36 where execution of the current instruction is started. It will be appreciated that FIG. 3 illustrates a system in which execution occurs when a match does not occur, but alternative embodiments could equally well be ones in which execution occurs when a match occurs.

Following step 36, processing proceeds to step 38 where a check is made as to whether or not early termination of the instruction is possible. This early termination may, for example, be because one of the operands has a particular value, such as zero or unity, or on subsequent processing cycles that a particular partial result has been produced. If early termination is possible, then processing proceeds to step 40 where a check is made as to whether or not the processor core 4 is currently operating in the fixed or variable timing mode. If the processor is in the variable timing mode, then processing proceeds to step 42 and the instruction concerned is early terminated with the result being returned as appropriate and processing returns to step 28.

If the determination at step 40 is that the system is in the fixed timing mode, then processing proceeds to step 44 irrespective of the fact that early termination is possible. Step 44, which may also be reached by a determination at step 38 that early termination is not possible, executes the instruction concerned for one processing cycle. In the case of a multicycle processing instruction, such as a multiplication, a divide, an add or a subtraction, these typically take several cycles to execute and so after step 44 processing proceeds to step 46 at which a determination is made as to whether or not the maximum number of cycles associated with that instruction has yet been performed. If the maximum number of cycles has been performed, then the result will have been generated. If early termination was possible and the system was being forced to continue to execute for further processing cycles, then step 46 will still indicate that this forced execution should cease when the maximum possible number of processing cycles for that type of instruction has been reached. If the maximum number of processing cycles has not yet been performed, then processing is returned to step 38.

If the match tested for at step 34 was positive, then processing proceeds to step 48. In this example, the positive detection of a match at step 34 indicates that execution of the particular instruction should be suppressed. Step 48 determines whether or not the system is currently in the forced execution mode. If in the forced execution mode, then processing proceeds to step 50 where a forced dummy execution of the instruction will occur. When dummy execution is performed the result is written to a trash register (see trash register 51 in FIG. 1), rather than the destination specified in the instruction itself so as to prevent the state of the system being modified by a program instruction which should not have executed as it should have been suppressed whilst also keeping a substantially unaltered power consumption. If at step 48 the determination is that the system is not in the forced execution mode but is in the variable timing mode, then processing bypasses step 50 and returns to step 28 with the program instruction being suppressed in the normal way.

It will be appreciated that FIG. 3 illustrates a generic system in which dummy execution is applied to all condition code failed instructions and all early termination of instructions is suppressed. In practice, it is also possible for these techniques to be applied to a subset of conditional instructions and instructions capable of early termination. The multiple configuration controlling bits mentioned above could be used to selectively turn on features such as early terminate suppression, but not others, such as dummy execution following a condition code fail.

Figure 4:
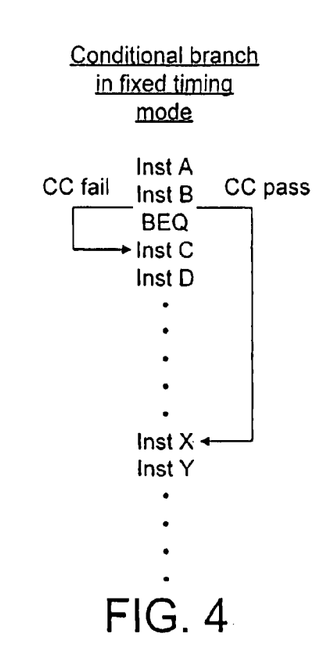
FIG. 4 schematically illustrates the execution of a conditional branch instruction in a fixed timing mode.

FIG. 4 schematically illustrates the execution of a conditional branch instruction in the fixed timing mode. A sequence of instructions AB are executed until a conditional branch instruction BEQ (branch upon equal) is reached. This instruction encodes the behaviour that the specified branch will be performed if the flag indicating an equal result from previous processing is set and will be suppressed if this flag is not set. When the condition codes are passed, i.e. a condition code match, then the branch is taken and processing proceeds to instructions X, Y, etc. If the condition codes fail, then instead of being suppressed in its entirety, the BEQ instruction performs a branch to the immediately following instruction C. This is the same instruction which would have been reached if the BEQ instruction had been suppressed and not executed at all. However, in the fixed timing mode, the BEQ will have executed consuming the same number of processing cycles irrespective of whether or not the condition codes were passed or failed. This helps obscure the results of data processing operations previously performed from a person trying to gain access to secure data.

Figure 5:
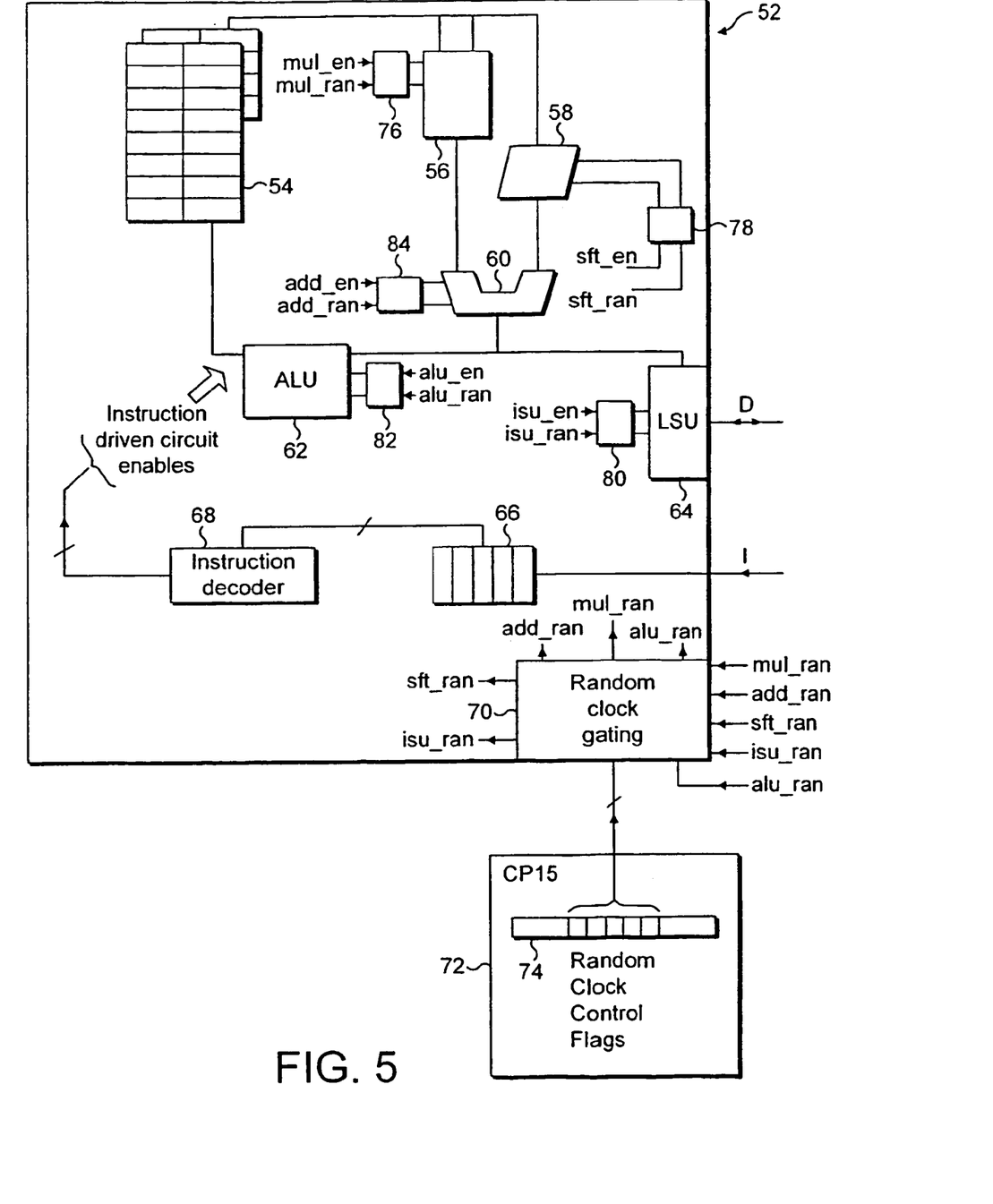
FIG. 5 is a diagram schematically illustrating a data processing system including multiple circuit portions which may be selectively enabled to perform required processing operations or dummy processing operations.

FIG. 5 schematically illustrates a data processing system 52 in the form of a programmable processor core which responds to program instructions I and manipulates data D. The data processing system 52 includes a register bank 54, a multiplier 56, a shifter 58, an adder 60, and arithmetic logic unit 62, a load store unit 64, a data pipeline 66, and instruction decoder 68 and a random clock gating circuit 70. A system configuration coprocessor CP15 72 is coupled to the processor core. The system configuration coprocessor 72 includes a system configuration register 74 holding multiple flag values which respectively serve to enable or disable the pseudo random dummy activity of different circuit portions of the data processing system 52. It will be appreciated that the data processing system 52 will typically include many more circuit elements, but these have been omitted for the sake of clarity from FIG. 5.

Associated with the multiplier 56 is a dummy activity enable circuit 76 which serves to enable dummy activity in the multiplier 56 as appropriate or alternatively pass the required activity enable signals to activate the multiplier 56 when the program instruction being executed so requires. Similar dummy activity enables circuits 78, 80, 82, 84 are associated with the respective other circuit portions 58, 60, 62, 64 previously mentioned.

In operation, instructions to be executed are to be passed to the instruction pipeline 66 and on to the instruction decoder 68 to generate instruction driven enable signals which are applied to respective circuit portions. These enable signal serve to select the data path through the data processing system 52 and to activate the circuit portions concerned to read their inputs, to perform the specified processing and to generate their associated output signals. As an example, a multiplier-accumulate operation might read data values from the register bank 54, apply these to the multiplier 56 and adder 60 and then write back the result to the register bank 54. Thus, the register bank 54, the multiplier 56 and the adder 60 would all be subject to required activity enable signals which both enabled their operation and selected them to form a complete data path. The different circuit portions have different power consumption characteristics and timing characteristics such that external observation could reveal which instruction were being executed by observing such parameters. Accordingly, pseudo random dummy activity of the other circuit portions not required for the instruction being executed is also enabled. Thus, even though the shifter 58 may not being used by the particular multiplier accumulate instruction being executed, it may nevertheless be pseudo randomly enabled such that it will consume power by shifting whatever value is applied to its input. Its output latches will not be enabled to avoid this dummy activity altering the circuit state an undesired way which may interfere with required operation e.g some circuit portions might assume persistence of output values. The dummy activity is enabled for time periods matching the normal operation timings for the circuit portions concerned.

The random clock gating circuit 70 serves to receive a plurality of pseudo random enable signals for different respective circuit portions and gate these for applying to respective circuit portions under the control of configuration parameters read from the system configuration register 74 within the system configuration coprocessor 72. These configuration flags may indicate that dummy activity should be enabled for the shifter 58, ALU 62 and multiplier 56, but not for the adder 60 or the load store unit 64. The different pseudo random enable signals allow different pseudo random characteristics to be applied in a manner that can match these respective circuit portion concerned. As an example, there may a different minimum enable time associated with the normal timing of the different circuit portions.

At an overall level, it will be seen that the instruction decoder 68 will serve as a required activity enabling circuit which will enable the circuit portions required to perform the data processing operation specified by the instruction currently being executed superimposed upon this required activity, various dummy activities within the other circuit portions will be enabled/stimulated by the dummy activity control circuitry provided in various places in the rest of the data processing system 52. The dummy activity serves to mask the power consumption and timing characteristics associated with the required activity.

Figure 6:
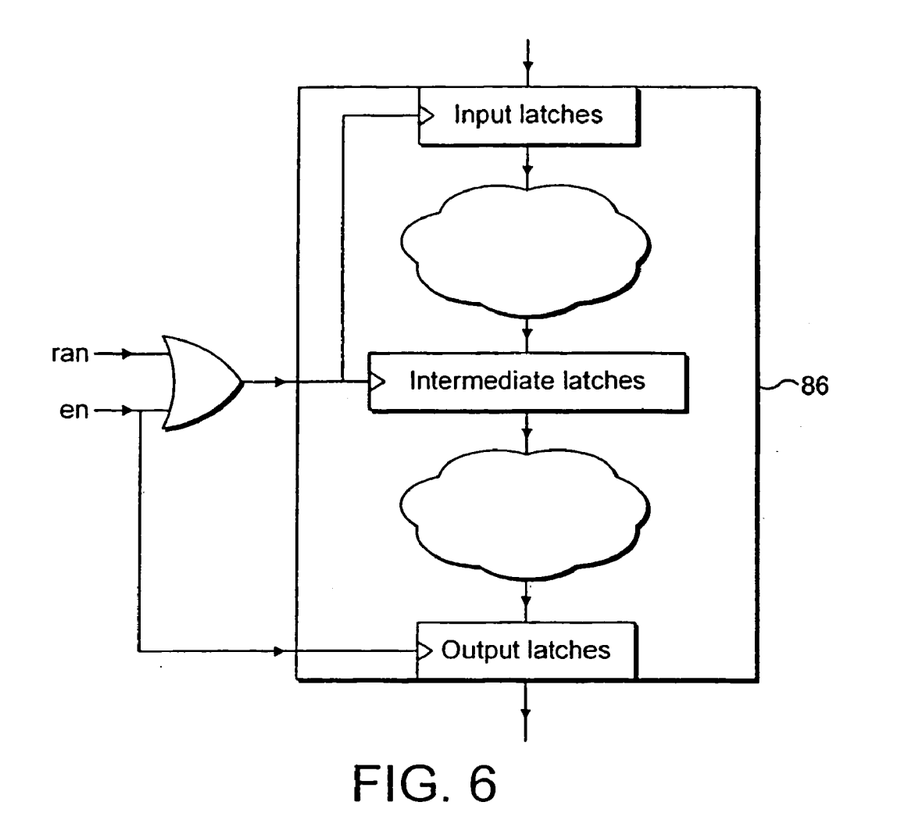
FIG. 6 schematically illustrates a circuit portion and its associated dummy activity enabling circuit which may be responsive to both required enable signals and random dummy activity enable signals.

FIG. 6 schematically illustrates a circuit portion 86 which may be subject to both a required enable signal en and a dummy enable signal rnd. This circuit portion 86 can be considered as a sequence of latches between which processing logic manipulates data values. When genuine required activity is necessary, all of the latches that provide a data path through the circuit portion 86 are enabled and the required processing will be performed between the input latches and the output latches. When dummy activity is instructed, then only the input latches and the intermediate latches are enabled. Thus, a data path is not provided through the full circuit portion and the output values generated by that circuit portion are not altered.

Figure 7:
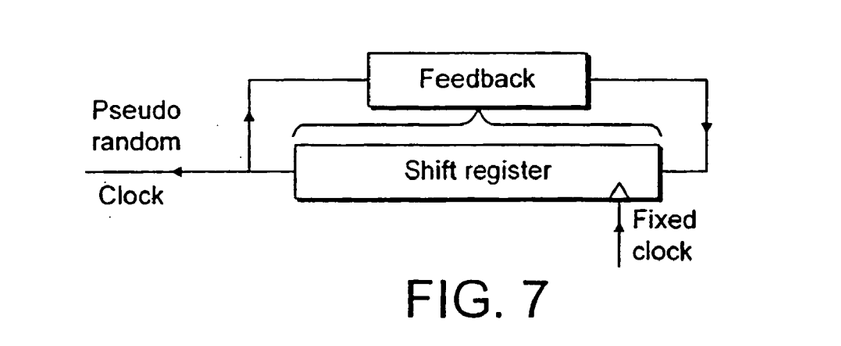
FIG. 7 schematically illustrates a linear shift back feed register which may be used as a pseudo-random signal generator.

FIG. 7 illustrates a linear feedback shift register of the type which may be used to generate pseudo random clock signal. These clock signals can be provided to the random clock dating circuit 72 of FIG. 5. Separate pseudo random signal generators may be provided for the different circuit portions. The fixed clock frequency associated with the different pseudo random generators may be altered so as to match the characteristics of the circuit portion concerned and further obscure the masking operation as required.

Figure 8:
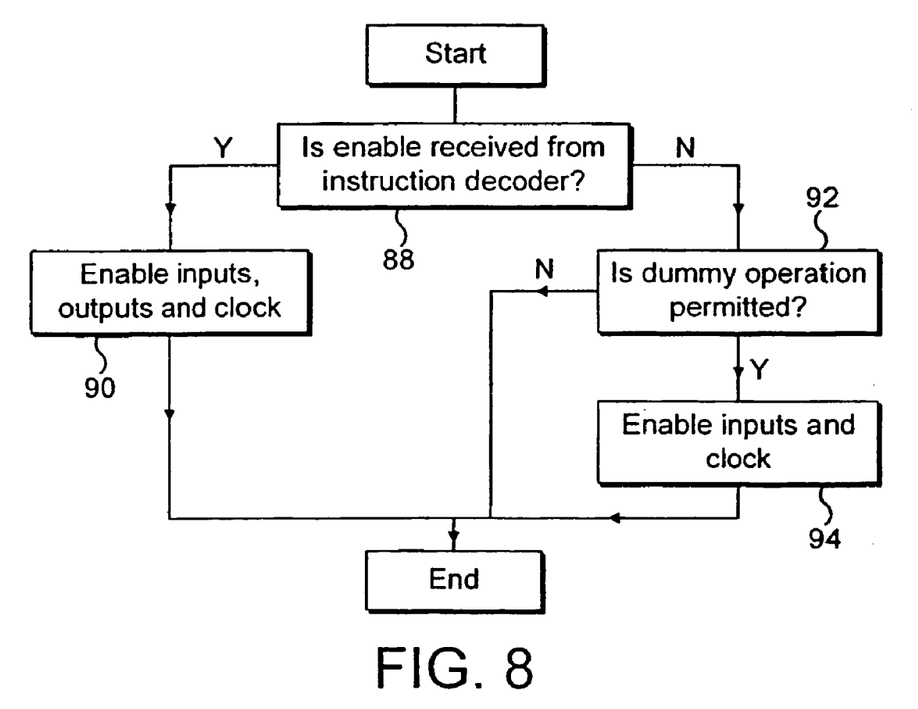
FIG. 8 is a flow diagram schematically illustrating control of a circuit portion to perform required processing activity and dummy processing activity.

FIG. 8 schematically illustrates the control of an enable signal for a circuit portion. At step 88 a determination is made as to whether or not an enable signal en has been received from the instruction decoder 68. If such an enable signal has been received, then processing passes to step 90. An enable signal from the instruction decoder 68 indicates that required processing operation is necessary in accordance with a genuine program instruction being decoded. Thus, step 90 enables the input, output and clock signal to the circuit portion concerned. If at step 88 no enable signal en is received from the instruction decoder, then processing passes to step 92 where a determination is made as to whether or not dummy operation of that circuit portion is permitted. If dummy operation is permitted, then processing proceeds to step 94 at which the inputs and clock to the circuit portion are enabled, but the outputs from the circuit portion are not enabled. The circuit portion then undertakes dummy activity. If the determination at step 92 was that dummy operation was not permitted, as indicated by the system configuration parameter(s), then processing terminates by passing to step 94.

It will be appreciated that the process illustrated in FIG. 8 is in the form of a sequential flow diagram. In practice, this control may be performed in a different sequence and use circuit elements spread throughout the data processing system 52. The operations illustrated as being sequentially performed may in fact be performed in parallel or the control functions modified. At an overall level an individual circuit portion will be enabled to perform its normal required operation in response to an appropriate program instruction and will be enabled to perform dummy activity when permitted by the associated configuration parameter.

Figure 9:
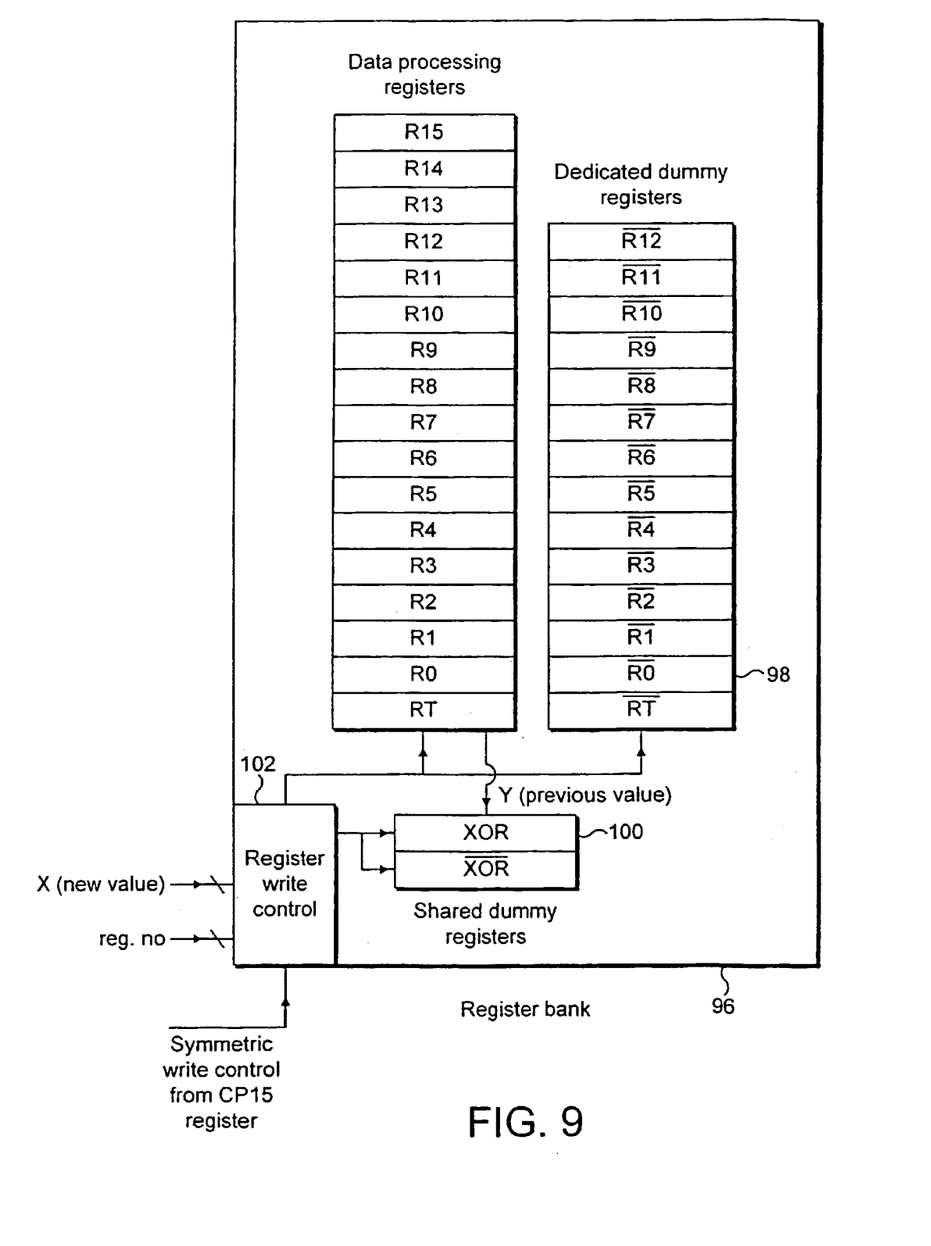
FIG. 9 schematically illustrates a portion of a register bank including multiple data processing registers, multiple dummy registers, multiple shared dummy registers and a non-mapped trash register RT to which a dummy register write is made when a conditional write operation fails its condition codes.

FIG. 9 schematically illustrates a register bank 96. This register bank is based upon the ARM processor programmer's model for user mode operation in accordance with processors designed by ARM Limited, Cambridge, England). In practice, further registers may be provided for other processor modes, but these have been omitted for the sake of clarity. The normal data registers R0 to R15 are provided for holding data values. The registers R13, R14 and R15 typically serve to store the program counter value, the branch return address value and the stack pointer, which tend to be none security related data values. Accordingly, transition balancing upon data writes is not necessary for R13, R14 and R15. A trash register RT is provided within the register bank 96 for use in association with conditional writes which fail their condition codes thus, a conditional write instruction which fails its condition code would not normally make any write. However, with this system such a failed conditional write instruction nevertheless writes a data value to the trash data register RT even though the condition codes have failed. This masks any difference in power consumption or timing that might be associated with condition code failure or condition code passing of a conditional write operation. The trash data register RT does not appear in the programmer's model in a way that enables it to be addressed with a register specifying operand within an instruction.

As well as the trash data register RT, further registers 98, 100 are also provided for the purpose of balancing the high to low and low to high transitions. Dedicated dummy registers 98 are provided in respect of the data registers R0 to R12 as well as the trash data register RT. Shared dummy registers 100 are provided for storing an exclusive OR value as well as the inverse of the exclusive OR value in response to each write to a data register subject to the transition balancing technique. A register write control circuit 102 serves to generate the appropriate data values to be written to the further registers 98, 100 in response to a data value write to a data register. This symmetric write control is selectively enabled and disabled by an appropriate system configuring controlling flag signal from the system configuring coprocessor 72.

Figure 10:
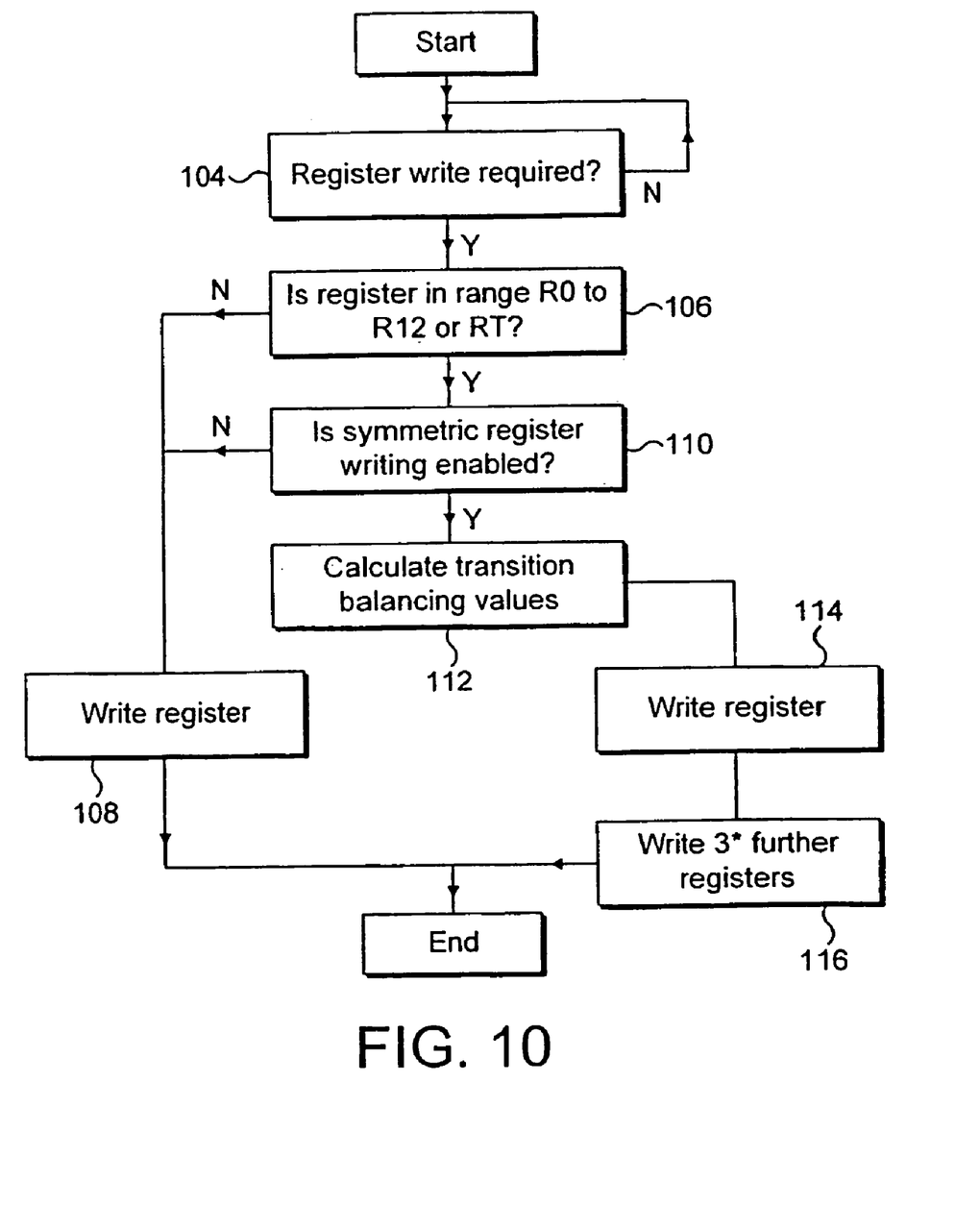
FIG. 10 is a flow diagram schematically illustrating a register write controlling circuit which seeks to balance the number of high to low and low to high transitions occurring when a register write occurs.

FIG. 10 is a flow diagram schematically illustrating the operation of the register write control circuit 102. At step 104 the circuit waits for a register write operation to be instructed. Step 106 determines whether this register write is to one of the data registers or the trash data registers RT for which the symmetric write control system is applied. If the register write is not to such a register, then processing proceeds to step 108 and a simple write of the required data value X is made to one of the registers R13, R14 and R15.

If the register to which the write is being made is potentially subject to symmetric register writing then step 110 serves to determine whether or not this feature is currently enabled. If this feature is not currently enabled, then processing proceeds to step 108. If this feature is enabled, then processing proceeds to step 112.

Figure 11:
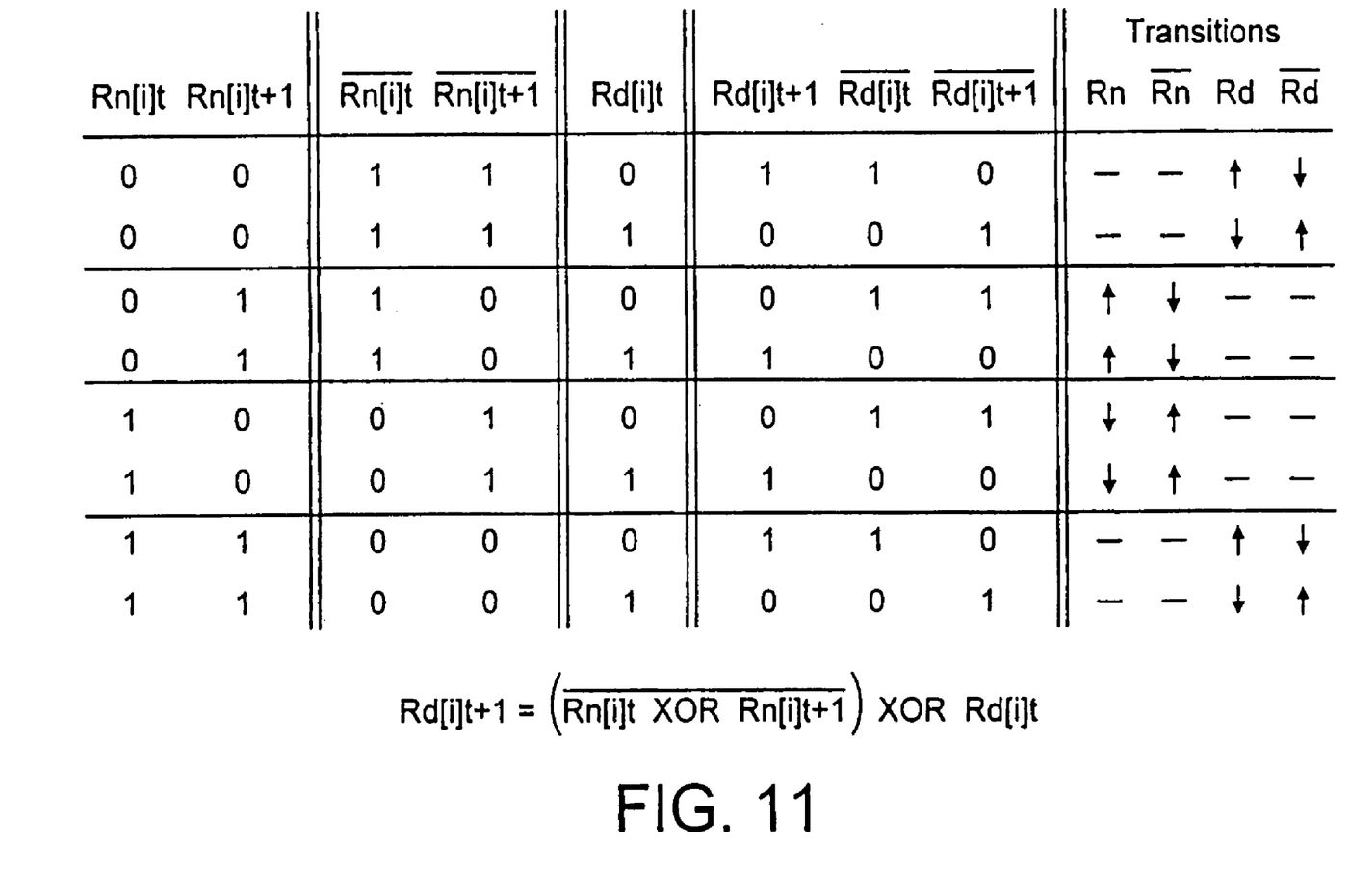
FIG. 11 is a table illustrating the relationships between bit transitions for a particular bit within the data register and three further registers which are configured to balance the high to low and low to high transitions occurring in association with a register write.
Figure 12:
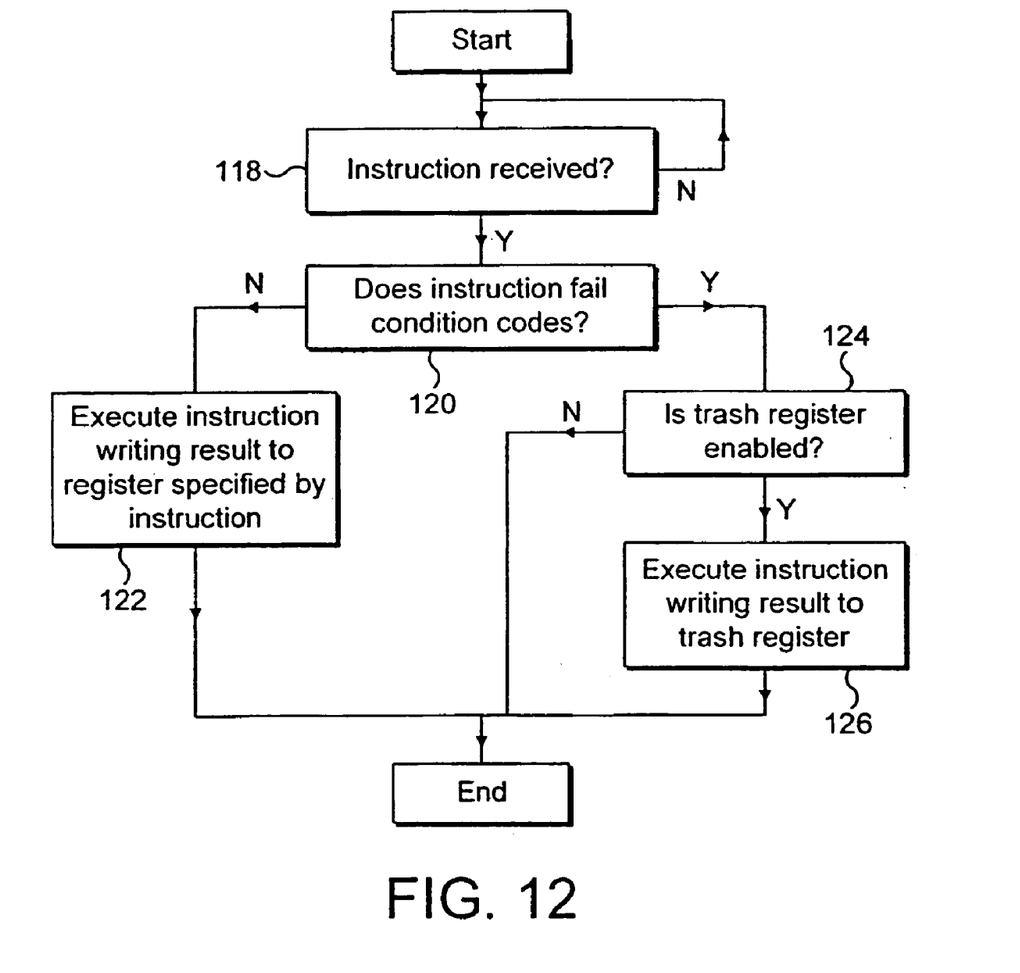
FIG. 12 is a flow diagram schematically illustrating control of writing to a trash register on a condition code fail of a write operation.

At step 112, the register controls circuit calculates for each bit position within the data value a value being the inverse exclusive OR of the current bit being written at that position and the previously stored bit at that position which is then exclusive Ored with the previously stored dummy register value for that bit position (see FIG. 11). The register control circuit 102 also calculates the inverse of the determination as well the inverse of the bit being written as the data value to the data register. These values are calculated for all of the bits being written (e.g. 3 dummy 32-bit values).

At step 114 the data value is written to the data register in a similar manner to step 108. At step 116 the three further values determined for each bit position within the registers concerned are written to the three further registers. Steps 114 and 116 take place simultaneously. As will be discussed in relation to FIG. 11, this results in a balance number of high to low and low to high transitions and thus power consumed.

FIG. 11 illustrates a table of possible bit values before and after a data write operation. The data value is being written to a register Rn, which is a register to which the symmetric write operation function is applied. The values at time t and time t+1 are illustrated. The inverse of these values is simply determined. Each of the data registers subject to this symmetric operation is provided with a dedicated dummy register 98 which stores the inverse of the data value currently held in the data register.

The shared dummy registers 100 are indicated in FIG. 11 as registers Rd. For each bit position on within the shared dummy register Rd the new value to be written at that bit position when a data write occurs is determined by the function shown at the bottom of FIG. 11. This function ensures that when a change does not occur in the data value and the inverse of the data value, then a change is guaranteed to occur in the corresponding bit within the shared dummy register and accordingly its inverse. The table shows the changes in the shared dummy register values which occur when the data value does not change and the shared values in the dummy register values not changing when the data value does change. Thus, there is a guaranteed fixed number of transitions for every write, i.e. a balanced equal number of transitions high to low and low to high.

Figure 13:
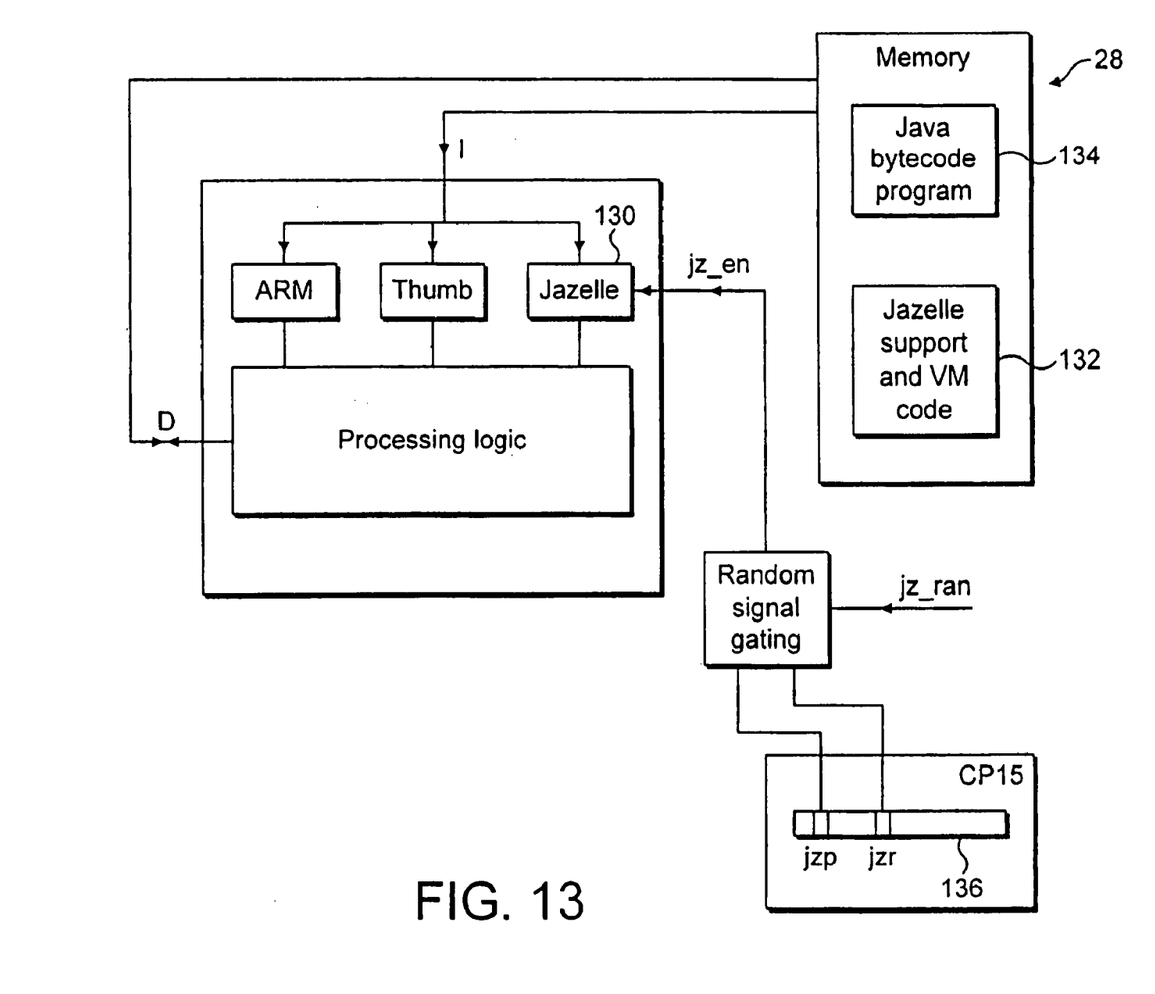
FIG. 13 is a diagram schematically illustrating a system having multiple execution mechanisms for an instruction and pseudo random selection of the execution mechanism employed for at least some instructions.

FIG. 13 is a flow diagram illustrating the action of the dummy data register RD to provide writes when a write operation fails its condition code(s). At step 118 the control logic waits for an instruction to be received. This control logic may be the instruction decoder 68 or other logic. Step 120 determines whether or not the instruction failed its condition codes. If the instruction does not fail its condition code, then it is normally executed at step 122 and makes its write to the register specified by the register operand within that instruction. If the instruction does fail its condition codes, then processing proceeds to step 124 at which a determination is made as to whether or not dummy data register writes are enabled. If these are not enabled, then processing terminates. If dummy data register writes are enabled, then processing proceeds to step 126 at which a write of the data value calculated by the condition code failed instruction is written to the trash data register RT even though the condition codes failed. This balances the power consumption and timing irrespective of a condition code pass or a condition code fail. It will be appreciated that the trash data register RT is also subject to the transition balancing mechanisms previously discussed.

FIG. 13 illustrates a data processing system 128 in which multiple instruction execution mechanisms are provided for at least some instructions. The data processing system 128 is one which supports the native execution of at least some Java bytecode instructions. This type of data processing system and native execution is described in published PCT Patent Application Number WO-A-02/29555. The disclosure of this published application as a whole and in respect of the native hardware execution and selective software emulation of more complex Java bytecodes in particular is incorporated here in by reference.

The Java bytecode decoder 130 may be selectively enabled and disabled by an input signal. When the Java bytecode decoder 130 is disabled a received Java bytecode will trigger an exception which starts execution of software emulation code for handling Java bytecodes using the native ARM Thumb instruction sets. This support code is stored within memory in area 132 as illustrated. The Java bytecode program 134 is also stored within memory. When it is desired to obscure the nature of the Java program execution, the Java bytecode decoder 130 may be subject to a pseudo random signal which selectively enables and disables this element so as to effectively switch the instruction execution mechanism for the Java bytecodes between a mixed hardware and emulation execution mechanism and a purely emulation mechanism. Configuration controlling values within a system configuration register 136 specify whether or not the Java decoder 130 is present and whether or not random enabling and disabling of this Java decode 130 is permitted.

Figure 14:
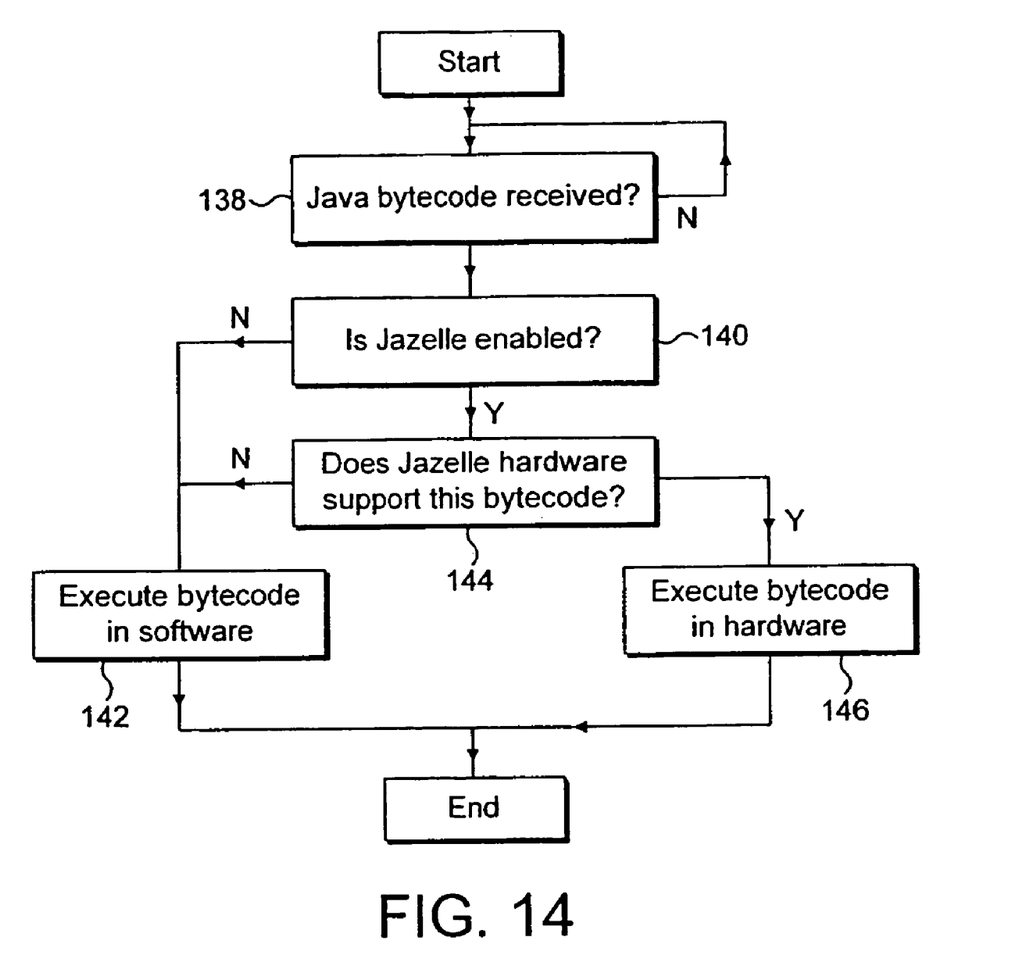
FIG. 14 is a flow diagram schematically illustrating control of the system of FIG. 13.

FIG. 14 schematically illustrates the handling of a received Java bytecode. At step 138 a Java bytecode is received. Step 140 determines whether or not the Java decoder 130 is enabled. The pseudo random enabling and disabling of the Java decoder 130 effectively causes a branch to either step 142 at which the bytecode is always emulated or an attempt to execute the instruction in hardware at step 146. This obscures/masks the power signature associated with Java bytecode execution. If the determination at step 146 is that the particular Java bytecode concerned is not supported by the Java decoder 130, then this Java bytecode will also be emulated in software at step 142. However, if the Java bytecode is supported in hardware, then it is executed in hardware at step 146.

The invention claimed is:

1. Apparatus for processing data, said apparatus comprising:

a processor responsive to a plurality of different program instructions to perform respective processing operations each requiring a number of processing cycles to complete, said plurality of program instructions including at least one variable timing instruction requiring between a minimum number of cycles and a maximum number of cycles to complete, wherein said processor is operable in a variable timing mode in which said at least one variable timing instruction is permitted to take a variable number of processing cycles to complete; and said processor is operable in a fixed timing mode in which said at least one of variable timing instruction is forced to take said maximum number of cycles to complete.

2. Apparatus as claimed in claim 1, wherein said at least one variable timing instruction includes a conditional instruction, said processor being operable in said variable timing mode to suppress execution of said conditional instruction in dependence upon one or more condition codes set in response to execution of one or more previously executed program instructions and said processor being operable in said fixed timing mode to complete said conditional instruction in a fixed number of processing cycles irrespective of said one or more condition codes set in response to execution of one or more previously executed program instructions.

3. Apparatus as claimed in claim 2, wherein when executing said conditional instruction in said fixed timing mode, if said conditional codes are such that execution of said conditional instruction would have been suppressed in said variable timing mode, then said conditional instruction is blocked for making any change effecting subsequent data processing operations.

4. Apparatus as claimed in claim 3, wherein if said conditional instruction is a conditional branch instruction, then when executing said conditional branch instruction in said fixed timing mode, if said conditional codes are such that execution of said conditional branch instruction would have been suppressed in said variable timing mode, then said conditional branch instruction is forced to perform a branch to a next instruction irrespective of any branch target specified in said conditional branch instruction.

5. Apparatus as claimed in claim 3, wherein if said conditional instruction is a conditional data manipulating instruction, then when executing said conditional data manipulating instruction in said fixed timing mode, if said conditional codes are such that execution of said conditional data manipulating instruction would have been suppressed in said variable timing mode, then said conditional data manipulating instruction is prevented from writing a result to any normal result destination of said conditional data manipulating instruction.

6. Apparatus as claimed in claim 5, wherein if writing of said result to any normal destination is prevented, then said result is instead written to at least one dummy destination.

7. Apparatus as claimed in claim 6, wherein said at least one dummy destination include a dummy processor register.

8. Apparatus as claimed in claim 1, wherein said at least one variable timing instruction includes an instruction capable of early termination in dependence upon one or more data values being processed, said processor being operable in said variable timing mode to permit early termination and said processor being operable in said fixed timing mode to prevent early termination.

9. Apparatus as claimed in claim 8, wherein said instruction capable of early termination is one of:
 a multicycle multiply instruction;
 a multicycle divide instruction;
 a multicycle add instruction; and
 a mutlicycle subtract instruction.

10. Apparatus as claimed in claim 1, wherein said processor adopts said variable timing mode or said fixed timing mode in dependence upon a programmable mode controlling parameter.

11. Apparatus as claimed in claim 10, wherein said programmable mode controlling parameter is stored within a system configuration register.

12. Apparatus as claimed in claim 1, wherein said processor is switched into said fixed timing mode so as to disguise a program execution path.

13. A method of processing data using a processor responsive to a plurality of different program instructions to perform respective processing operations each requiring a number of processing cycles to complete, said plurality of program instructions including at least one variable timing instruction requiring between a minimum number of cycles and a maximum number of cycles to complete, said method comprising the steps of:
 operating said processor in a variable timing mode in which said at least one variable timing instruction is permitted to take a variable number of processing cycles to complete; and
 operating said processor in a fixed timing mode in which said at least one of variable timing instruction is forced to take said maximum number of cycles to complete.

14. A method as claimed in claim 13, wherein said at least one variable timing instruction includes a conditional instruction and further comprising operating said processor in said variable timing mode to suppress execution of said conditional instruction in dependence upon one or more condition codes set in response to execution of one or more previously executed program instructions and said processor being operable in said fixed timing mode to complete said conditional instruction in a fixed number of processing cycles irrespective of said one or more condition codes set in response to execution of one or more previously executed program instructions.

15. A method as claimed in claim 14, wherein when executing said conditional instruction in said fixed timing mode, if said conditional codes are such that execution of said conditional instruction would have been suppressed in said variable timing mode, then said conditional instruction is blocked for making any change effecting subsequent data processing operations.

16. A method as claimed in claim 15, wherein if said conditional instruction is a conditional branch instruction, then when executing said conditional branch instruction in said fixed timing mode, if said conditional codes are such that execution of said conditional branch instruction would have been suppressed in said variable timing mode, then said conditional branch instruction is forced to perform a branch to a next instruction irrespective of any branch target specified in said conditional branch instruction.

17. A method as claimed in claim 15, wherein if said conditional instruction is a conditional data manipulating instruction, then when executing said conditional data manipulating instruction in said fixed timing mode, if said conditional codes are such that execution of said conditional data manipulating instruction would have been suppressed in said variable timing mode, then said conditional data manipulating instruction is prevented from writing a result to any normal result destination of said conditional data manipulating instruction.

18. A method as claimed in claim 17, wherein if writing of said result to any normal destination is prevented, then said result is instead written to at least one dummy destination.

19. A method as claimed in claim 18, wherein said at least one dummy destination include a dummy processor register.

20. A method as claimed in claim 13, wherein said at least one variable timing instruction includes an instruction capable of early termination in dependence upon one or more data values being processed and further comprising operating said processor in said variable timing mode to permit early termination and said processor being operable in said fixed timing mode to prevent early termination.

21. A method as claimed in claim 20, wherein said instruction capable of early termination is one of:
 a multicycle multiply instruction;
 a multicycle divide instruction;
 a multicycle add instruction; and
 a mutlicycle substract instruction.

22. A method as claimed in claim 13, wherein said processor adopts said variable timing mode or said fixed timing mode in dependence upon a programmable mode controlling parameter.

23. A method as claimed in claim 22, wherein said programmable mode controlling parameter is stored within a system configuration register.

24. A method as claimed in claim 13, wherein said processor is switched into said fixed timing mode so as to disguise a program execution path.

* * * * *